United States Patent [19]

Meister

[11] Patent Number: 5,177,370
[45] Date of Patent: Jan. 5, 1993

[54] IMPACT SENSOR FOR VEHICLE SAFETY RESTRAINT SYSTEM

[76] Inventor: Jack B. Meister, 68 Chimney Ridge Dr. - P.O. box 216, Convent Station, N.J. 07961

[21] Appl. No.: 615,074

[22] Filed: Nov. 19, 1990

[51] Int. Cl.⁵ .............................. H01H 35/14
[52] U.S. Cl. ...................... 307/10.1; 200/61.45 M; 200/61.53; 73/519
[58] Field of Search ................ 307/121, 10.1; 200/61.45 R, 61.45 M, 61.52, 61.53; 73/517 R, 518, 519, 520; 324/174, 176, 179

[56] References Cited

U.S. PATENT DOCUMENTS

| | | | |
|---|---|---|---|
| 4,484,041 | 11/1984 | Andres et al. | 200/61.45 M |
| 4,494,712 | 1/1985 | Godwin, Jr. et al. | 242/191 |
| 4,508,280 | 4/1985 | Hayosh et al. | 242/191 |
| 4,609,059 | 9/1986 | Pasterkamp | 177/50 |
| 4,639,563 | 1/1987 | Günther | 200/61.45 M |
| 4,743,780 | 5/1988 | Opie | 307/419 |
| 4,827,091 | 5/1989 | Behr | 200/61.45 M |
| 4,922,065 | 5/1990 | Behr et al. | 200/61.45 M |
| 5,072,181 | 12/1991 | Burger | 324/207.25 |

Primary Examiner—A. D. Pellinen
Assistant Examiner—David Osborn

[57] ABSTRACT

An acceleration sensor that comprises a body of non-magnetic construction having a linear internal cavity of uniform cross section, and a pair of permanent magnetics movably mounted within such cavity with like magnetic poles opposed to each other, such that the magnetics are urged to opposite ends of the cavity by force of magnetic repulsion therebetween. At least one weigand wire is positioned externally of the cavity between the cavity ends, and has a longitudinal dimension parallel to the lineal dimension of the cavity. The weigand wire is characterized by two stable magnetic flux-generating states dependent upon application of an external magnetic field of appropriate polarity for switching between such states. An electrical coil is positioned adjacent to the weigand wire, and is responsive to switching between the two flux-generating states for generating a sensor output signal as a result of acceleration forces on either of the magnets sufficient to overcome the force of magnetic repulsion therebetween, and thus to bring one of the magnets into proximity with the wire. Additional magnets preset the weigand wire. Permeable material is used so that the magnetic force on the magnets does not change with a change in the position of the magnets.

33 Claims, 2 Drawing Sheets

IMPACT SENSOR FOR VEHICLE SAFETY RESTRAINT SYSTEM

The present invention is directed to an acceleration sensor having particular utility as an impact sensor for activating safety restraints, such as an air bag, in an automotive vehicle. In this connection, the term "acceleration" as employed in this application specifically includes both positive and negative acceleration—e.g., severe deceleration caused by impact of a vehicle.

BACKGROUND AND OBJECTS OF THE INVENTION

A number of impact sensors have heretofore been proposed for activating vehicle restraint systems and other similar applications. For example, U.S. Pat. No. 4,329,549 discloses a sensor in which a spherical ball is biased toward one end of a cavity by a permanent magnet positioned externally of the cavity. Severe deceleration of a vehicle, on which the sensor is mounted and appropriately oriented, exerts sufficient force on the ball to overcome the force of attraction to the magnet, and to propel the ball longitudinally through the cavity against a pair of switch contacts. The switch contacts are connected to suitable devices for inflating an air bag or the like to prevent impact of a vehicle occupant against the steering wheel or dashboard.

A disadvantage of this design is that closely controlled tolerances are required between the ball and the surrounding cavity, which are difficult and expensive to control in manufacture. Furthermore, the ball must be sufficiently large to generate reliable contact force against the switch elements, necessitating use of a large magnet and consequently decreasing responsiveness of the sensor to impact forces. Weight of the ball may be reduced by plating the switch contacts with gold or the like, increasing the cost of manufacture. Dust particles and the like decrease reliability of the mechanical switch contacts. Additionally, the sensor disclosed in this patent is not well adapted to respond to impacts from all directions, necessitating use of more than one sensor in automotive applications.

U.S. Pat. No. 4,827,091 discloses an impact sensor in which a permanent magnet is longitudinally movable within a cavity of a non-magnetic body. The magnet is biased toward one end of the cavity by magnetic attraction to a ring positioned externally of the cavity. One or more coils surround the cavity for sensing movement of the magnet therewithin. In addition, electrical switch contacts may be positioned at the opposing end of the cavity for abutting electrical and mechanical engagement with the magnet.

U.S. Pat. No. 4,484,041 discloses an impact sensor in which a permanent magnet is movably mounted within a cavity of a non-magnetic body, and normally held by magnet attraction against a magnetically permeable element that closes one end of the cavity. Application of acceleration forces on the body sufficient to overcome the force of magnetic attraction propels the magnet against a spring at the opposing end of the cavity, which returns the magnet to its normal position when the acceleration forces are removed. A reed switch is positioned adjacent to the cavity to detect motion of the magnet against the spring.

U.S. Pat. No. 4,639,563 discloses a sensor in which a pair of magnets are movably mounted within the cavity of a non-magnetic body and oriented such that like poles on the magnets are opposed to each other and hold the magnets against opposing ends of the cavity. A reed switch is positioned adjacent to the cavity and generates an output signal when acceleration forces on either magnet are sufficient to overcome the force of magnetic repulsion and move the magnet toward the center of the cavity.

A general object of the present invention is to provide an acceleration sensor that has particular utility as an impact sensor for activating a vehicle safety restraint system, that is compact and rugged in construction, that is reliable in operation, that activates quickly on application of vehicle impact forces, and/or that is inexpensive to manufacture. Another and more specific object of the present invention is to provide an impact sensor of the described character that embodies efficient, economical and reliable solid state technology. Yet another object of the present invention is to provide a vehicle restraint system that employs such a sensor.

SUMMARY OF THE INVENTION

An acceleration sensor that finds particular utility as an impact sensor in a vehicle safety restraint system comprises at least one magnet movably mounted within a longitudinal cavity in a non-magnetic body and facility for resiliently urging or biasing the magnet to one end of the cavity. In accordance with a first important aspect of the present invention, a solid state sensor is positioned externally adjacent to the cavity to detect motion of the magnet longitudinally of the cavity under force of acceleration on the magnet against such biasing force. The solid state sensor in accordance with this first aspect of the invention preferably comprises a weigand wire having a longitudinal dimension parallel to the cavity, and being characterized by first and second stable magnetic flux-generating states responsive to proximity of a magnetic field of appropriate polarity for switching between such states. A suitable pick-up, such as an electrical coil, is positioned adjacent to the weigand wire, preferably encircling the same, for detecting a change in the flux-generating state of the weigand wire responsive to proximity of the sensor magnet thereto, and thereby generating a sensor output signal.

An acceleration sensor in accordance with a presently preferred embodiment of the invention comprises a body of non-magnetic construction having a linear internal cavity of uniform cross section, and a pair of permanent magnetics movably mounted within such cavity with like magnetic poles opposed to each other, such that the magnetics are urged to opposite ends of the cavity by force of magnetic repulsion therebetween. At least one weigand wire is positioned externally of the cavity between the cavity ends, and has a longitudinal dimension parallel to the lineal dimension of the cavity. The weigand wire is characterized by two stable magnetic flux-generating states dependent upon application of an external magnetic field of appropriate polarity for switching between such states. An electrical coil is positioned adjacent to the weigand wire, and is responsive to switching between the two flux-generating states for generating a sensor output signal as a result of acceleration forces on either of the magnets sufficient to overcome the force of magnetic repulsion therebetween, and thus to bring one of the magnets into proximity with the wire.

In accordance with another aspect of the present invention, first and second magnetically permeable elements are positioned on the non-magnetic body externally of the cavity and adjacent to opposed ends thereof so as to attract the adjacent magnet toward the associated cavity end, and thereby assist the force of magnetic repulsion between the magnets to bias the magnets toward the cavity ends. A particularly significant feature of this aspect of the invention is that such magnetically permeable elements are so constructed and arranged with respect to each other, and with respect to the magnets, that the sum of the magnetic forces on the magnets remains substantially constant independent of position of the magnets within the cavity. That is, whereas the force of repulsion between the magnets increase exponentially as one of the magnets moves toward the other, the force of attraction between that magnet and its associated magnetically permeable element decreases exponentially. Thus, by appropriately tailoring the various magnetic elements, the sum of the magnetic forces on each magnet may be made substantially constant In various embodiments of this aspect of the invention, the sensor output signal may be generated by a weigand wire and coil arrangement centrally disposed adjacent to the cavity as previously described, by a solid state Hall-effect sensor centrally disposed adjacent to the cavity, or by an electromechanical switch in which one switch contact element protrudes into the cavity for contact with a magnetic moving under force of acceleration to move the switch contact against an adjacent fixed contact.

BRIEF DESCRIPTION OF THE DRAWINGS

The invention, together with additional objects, features and advantages thereof, will be best understood from the following description, the appended claims, and the accompanying drawings in which:

DETAILED DESCRIPTION OF PREFERRED EMBODIMENTS

Figure 1:
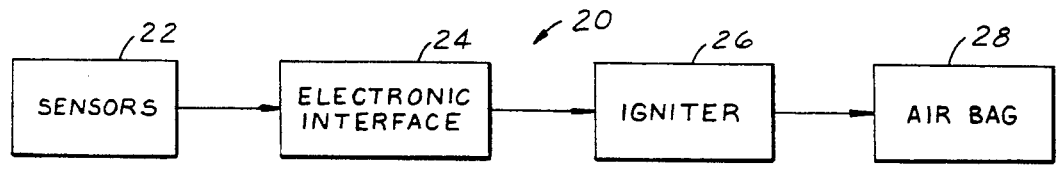
FIG. 1 is a functional block diagram of a vehicle safety restraint system in accordance with one presently preferred implementation of the invention.

FIG. 1 illustrates a vehicle restraint system 20 in which one or more impact sensors 22 provide output signals to an electronic interface 24 indicative of rapid deceleration of the vehicle caused by impact from one or more directions. Interface 24 provides a corresponding signal to an igniter or squib 26, which in turn initiates a chemical reaction for rapidly inflating a vehicle restraint air bag 28.

Figure 2:
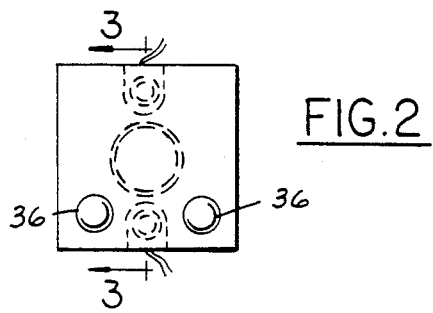
FIG. 2 is an end elevational view of an impact sensor in accordance with one embodiment of the invention.
Figure 3:
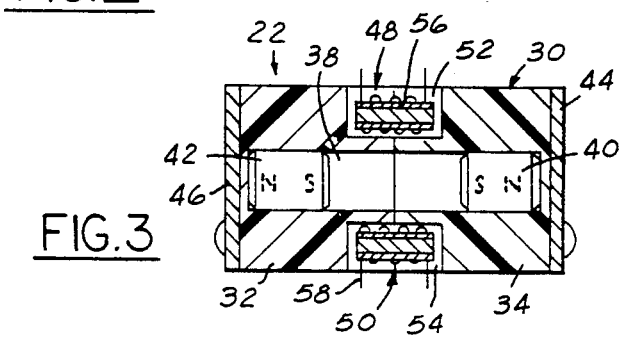
FIG. 3 is a sectional view in side elevation taken substantially along the line 3—3 in FIG. 2.

FIGS. 2-3 illustrate a sensor 22 in accordance with one presently preferred embodiment of the invention as comprising a body 30 of non-magnetic material such as plastic. Body 30 is composed of two cup-shaped sections 32,34 fastened in opposition by bolts 36 of brass or other suitable non-magnetic material so as to form a closed cylindrical internal cavity 38. A pair of substantially cylindrical identical permanent magnets 40,42 are slidably disposed within cavity 38. Each magnet 40,42 is axially polarized, and like poles of the respective magnets—i.e., the south poles S in the illustration of FIG. 3—are opposed to each other. In this way, the force of magnetic repulsion between magnets 40,42 resiliently urge the respective magnets toward the opposite ends of cavity 38 against the opposing bases of the respective cup-shaped sections 32,34. A pair of plates 44,46 are affixed by bolts 36 to the outside of the respective section bases, and therefore externally of cavity 38. Plates 44,46 are of magnetically permeable construction, such as steel. Thus, force of attraction between magnet 40 and plate 44, and between magnet 42 and plate 46, assists the force of repulsion between the magnets in biasing the magnets toward the respective cavity ends. A pair of weigand wire sensors 48,50 are positioned in associated pockets 52,54 diametrically opposed to each other midway between the ends of the cavity, and therefore midway between the magnets 40,42. Each sensor 48,50 comprises a length of weigand wire 56, having a lineal dimension parallel to the axis of cavity 38, surrounded by an electrical coil 58.

Figure 4A:
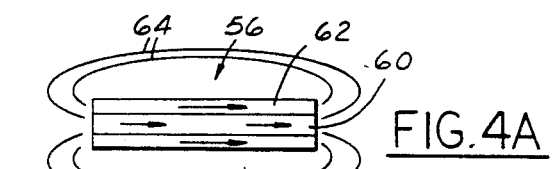
FIGS. 4A-4C are schematic diagrams useful in describing operation of the weigand wire solid state sensor arrangement in the embodiment of FIGS. 2-3.
Figure 4B:
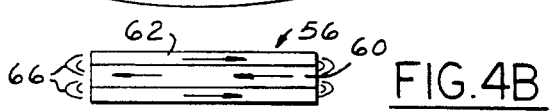
Figure 4C:
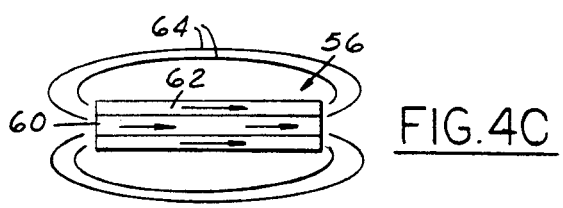

Magnetic operation of weigand wires 56 is illustrated in FIGS. 4A-4C. Each weigand wire section 56 has a central core wire 60 surrounded by a shell 62. Initially, as shown in FIG. 4A, the magnetic fields in core 60 and shell 62 are in the same direction, so that the core and shell combine to generate a strong external magnetic field illustrated by the flux lines 64. When wire 56 is exposed to a magnetic filed having a direction opposite to the polarity illustrated in FIG. 4A, the field in core 60 reverses, so that the external lines of flux essentially collapse and the magnetic field is essentially internal, as shown at 66 in FIG. 4B. When the wire 56 is thereafter subjected to a magnetic field of polarity opposite to the polarity in core 60, the strong external magnetic field is restored, as shown in FIG. 4C. The magnetic flux-generating states of FIG. 4B on the one hand, and FIGS. 4A and 4C on the other, are stable, and are thus responsive to proximity of a magnetic field of the appropriate polarity—i.e., opposite to the polarity of the wire core—to switch to the opposing state. (The "weigand effect" is discussed in greater detail in U.S. Pat. No. 3,820,090.) Coils 58 (FIG. 3) surrounding wires 56 detect such changes of state. Preferably, coils 58 and electronic interface 24 (FIG. 1) are responsive in particular to the change of state from that illustrated in FIG. 4B to that illustrated in FIG. 4C for generating an appropriate signal to igniter 26.

Figure 5:
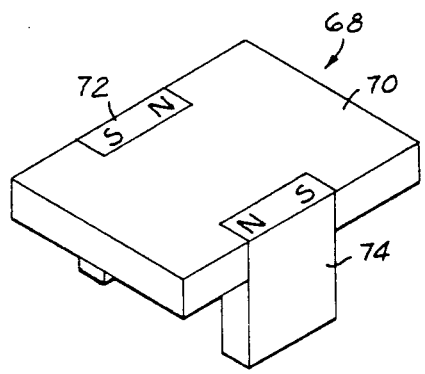
FIG. 5 is a perspective view of a device for setting the sensor of FIGS. 2-3 for operation as a vehicle impact sensor.
Figure 6:
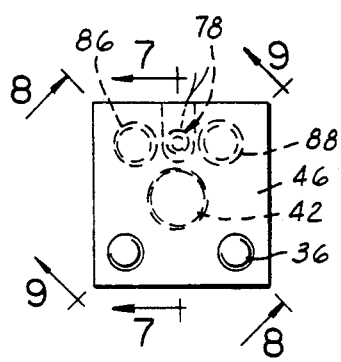
FIG. 6 is an end elevational view of a sensor in accordance with a second embodiment of the invention.
Figure 7:
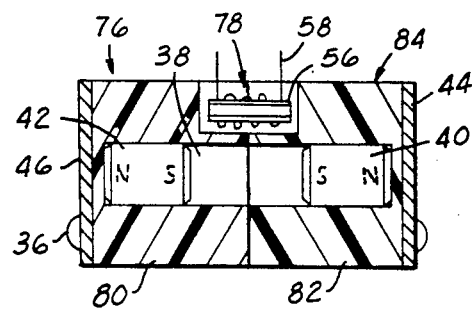
FIGS. 7-9 are sectional views taken along the respective lines 7—7, 8—8 and 9—9 in FIG. 6.

In the embodiment of FIGS. 2-3 the two sensors 48,50 are initially set to the conditions of FIG. 4B, but are polarized in opposite directions so that each sensor is responsive to one, but not both, of the magnets 40,42. Thus, in the configuration illustrated in FIG. 3, weigand wire 56 of sensor 48 must initially be polarized to the magnetic field orientation of FIG. 4B, so as thereafter to be responsive to proximity of magnet 42 to assume the magnetic field configuration illustrated in FIG. 4C. Likewise, weigand wire 56 of sensor 50 must initially be polarized to a magnetic field orientation opposite to that illustrated in FIG. 4B, so as thereafter to be responsive to proximity of magnet 40 to assume a magnetic field configuration opposite to that of FIG. 4C. This is accomplished employing the device 68 of FIG. 5, which comprises a non-magnetic plate 70 supporting a pair of magnets 72,74 at spacing from each other suitable for placement immediately external to sensors 48,50 in sensor 22, and having magnetic polarities suitable for setting or programming the respective weigand wires as previously described.

FIGS. 6-9 illustrate a modified sensor 76 in accordance with a second embodiment of the invention that embodies a single weigand wire sensor 78 and facility for self-setting or programming of weigand wire section 56. Sensor 76 comprises a pair of cup-shaped non-magnetic sections 80,82 joined by bolts 36 to form a body 84 having internal cavity 38. Plates 44,46 are also mounted by bolts 36, and magnets 40,42 are biased to the ends of cavity 38 by the cooperating magnetic force of mutual magnetic repulsion and attraction to plates 44,46 as previously described. A second pair of channels 86 (FIGS. 6 and 8) and 88 (FIGS. 6 and 9) are formed in body 84 laterally adjacent to—i.e., on either side of—sensor 78. A substantially cylindrical permanent magnet 90 (FIG. 8) is slidably disposed in cavity 86, and is biased by a non-magnetic coil spring 92 to the end of cavity 86 adjacent to magnet 42. It will be noted that axial polarization of magnet 90 is opposite to polarization of adjacent magnet 42. Likewise, a substantially cylindrical permanent magnet 94 is biased by a non-magnetic coil spring 96 within cavity 88.(FIG. 9) to a position laterally adjacent to magnet 40, and is of polarity opposite to the latter. Coil spring 92 (in combination with plate 46) biases magnet 90 to the position of FIG. 8 with lesser force than those that bias magnet 42 to the adjacent position. Likewise, spring 96 (in combination with plate 44) biases magnet 94 to the position illustrated in FIG. 9 with lesser force than those that bias magnet 40 to the adjacent position shown in that drawing figure.

Figure 8:
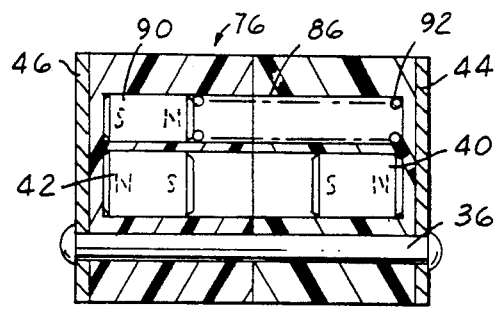
Figure 9:
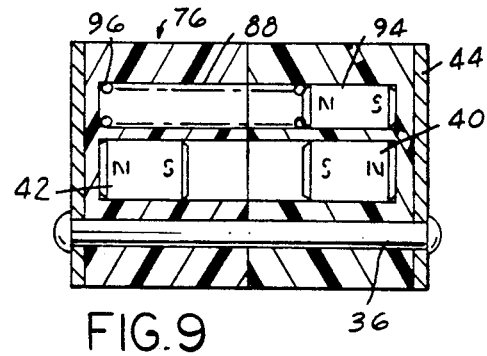

Thus, in the event of rapid deceleration of sensor 76 caused by vehicle impact or the like, the spring-biased magnet will move into proximity with weigand sensor 78 prior to movement of the primary magnet into proximity thereto. In this way, the spring-biased magnet has an opportunity to set the weigand wire sensor for subsequent immediate resetting by the primary magnet, and a consequent output from the sensor coil. In FIG. 8, for example, if sensor motion from left to right in that drawing figure is suddenly arrested due to impact of the vehicle, both magnets 90,42 tend to continue movement to the right against their respective biasing forces. Since the biasing force exerted by spring 92 is less than the biasing force exerted by repulsion from magnet 40, magnet 90 moves to the center position ahead of magnet 42, and effectively sets weigand wire 56 to the condition illustrated in FIG. 4B. Immediately thereafter, when magnet 42 moves into proximity with weigand sensor 78, the weigand wire assumes the magnetic condition illustrated in 4C, and the resulting change of magnetic state is sensed by coil 58 to inflate the air bag.

Figure 10:
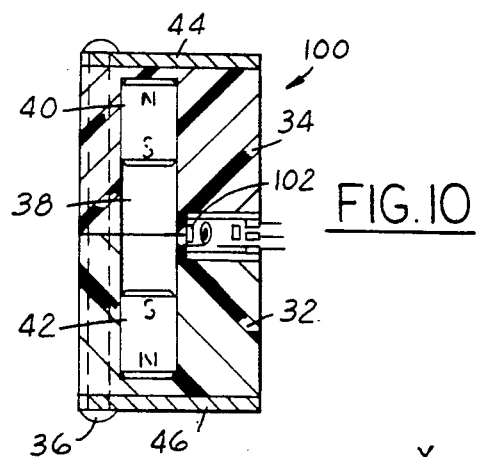
FIGS. 10 and 11 are respective sectional views in side elevation of modified embodiments of the invention.
Figure 11:
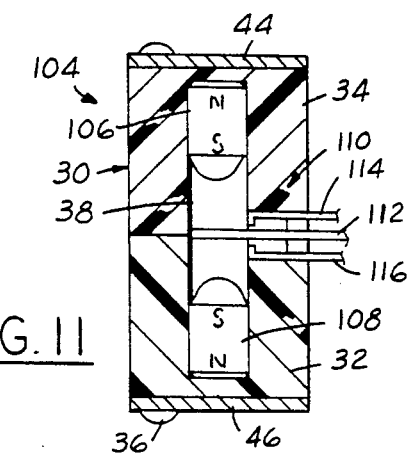

FIG. 10 illustrates a sensor 100 that is similar to that shown in FIGS. 2-3, with the exception that the two weigand sensors 48,50 in FIGS. 2-3 are replaced by a single Hall-effect sensor 102. When either magnet 40,42 moves into proximity with sensor 102, which is centrally disposed with respect to the longitudinal dimension of cavity 38, a corresponding output signal is generated by the sensor to electronic interface 24 (FIG. 1). FIG. 11 likewise illustrates a modified sensor arrangement 104 in which the opposed magnets 106,108 have opposed rounded noses, but are otherwise identical to magnets 40,42 previously discussed. A switch 110 is disposed centrally of cavity 38, and comprises a central contact 112 carried by body 30 and extending into cavity 38 for abutting engagement by the noses of magnets 106,108. A pair of fixed contacts 114,116 are carried by body 30 on either side of movable contact 112. Thus, downward movement of magnet 106, in the orientation illustrated in FIG. 11, would bring contact 112 into electrical and mechanical abutment with contact 116, closure of such contacts thereby providing an output signal from the sensor.

Figure 12A:
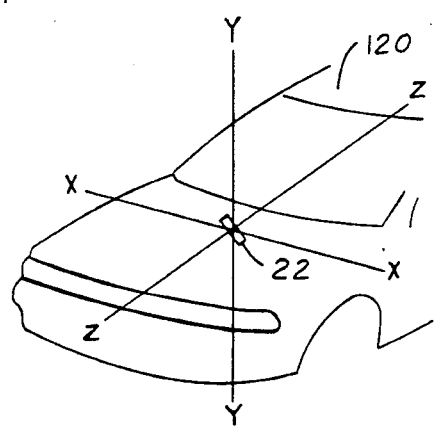
FIGS. 12A-12C are graphic illustrations useful in describing operation of the invention for sensing impact on a vehicle from any direction.
Figure 12B:
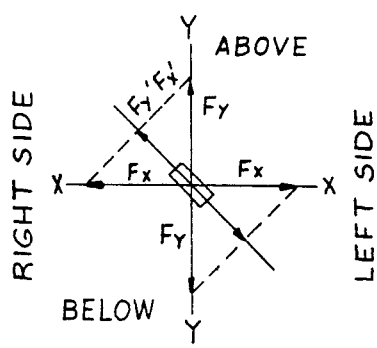
Figure 12C:
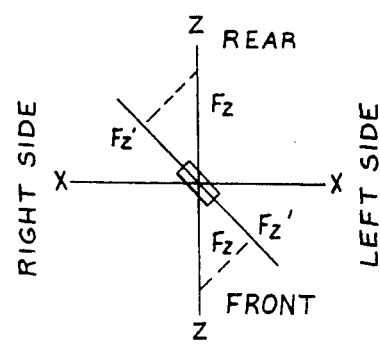

As shown in FIGS. 12A-12C, a single sensor 22 (or 76 or 100 or 104) may be positioned in a vehicle 120 at suitable angle to the three orthogonal X, Y and Z axes so as to be responsive to impact on the vehicle from any direction. For example, sensor 22 may be positioned at an angle of 45° to all three axes. The various forces on the magnets, controlled for example by magnet strength, magnet mass, thickness of the body material between the magnets and plates 44,46, may be selected in association with the particular vehicle model so that impact on the vehicle from any direction above some threshold value will produce a vector component along the axis of the sensor sufficient to move the sensor magnets into proximity with the associated sensor coil or switch.

I claim:

1. An acceleration sensor that comprises:
   a body of non-magnetic construction having a first internal cavity,
   a first permanent magnet mounted within said cavity for movement therewithin between at least first and second positions spaced from each other longitudinally in said cavity,
   means for resiliently urging said first magnet to said first position within said cavity,
   bistable magnetic flux-generating means carried by said body externally of said cavity adjacent to said second position, said flux generating means generating first and second stable states of magnetic flux, and being responsive to proximity of said first magnet for switching from said first state to said second state, and
   means positioned adjacent to said flux-generating means, and responsive to switching of said magnetic flux-generating means from said first state to said second state as a result of motion of said magnet from said first position to said second position to generate a sensor output signal,
   said magnet-urging means comprising a second permanent magnet mounted within said cavity at a position opposed to said first position of said first magnet, said first and second magnets having opposed like magnetic poles such that said first magnet is biased to said first position by magnetic repulsion from said second magnet, and
   magnetically permeable means positioned externally of said cavity adjacent to said first position, said second magnet and said magnetically permeable means being constructed and arranged such that the sum of the forces on said first magnet due to repulsion from said second magnet and attraction to said magnetically permeable means remains substantially constant between said first and second positions.

2. The sensor set forth in claim 1 wherein said bistable magnetic flux-generating means comprises a length of weigand wire carried by said body on an axis parallel to said cavity.

3. The sensor set forth in claim 2 wherein said signal-generating means comprises an electrical coil positioned adjacent to said weigand wire.

4. The sensor set forth in claim 3 wherein said coil encircles said weigand wire.

5. The sensor set forth in claim 1 further comprising means for setting said flux-generating means in said first state independently of said first magnet so as to prepare said flux-generating means for proximity of said first magnet to switch from said first state to said second state.

6. The sensor set forth in claim 5 wherein said setting means comprises permanent magnet means adapted to be selectively positioned externally of said body adjacent to said flux-generating means.

7. The sensor set forth in claim 5 wherein said setting means comprises: a second cavity in said body parallel to said first cavity, a second permanent magnet positioned within said second cavity for movement therewithin between at least a first position spaced from said flux-generating means and a second position adjacent to said flux generating means, and means for resiliently biasing said second magnet to said first position with a lesser force than that urging said first magnet to its first position, so that acceleration forces on said sensor urging said magnets toward said second position cause said second magnet to reach its second position adjacent to said flux-generating means, and thereby set said flux-generating means to said first state, prior to arrival of said first magnet at its second position.

8. The sensor set forth in claim 7 wherein said means for resiliently biasing said second permanent magnet comprises a coil spring.

9. A vehicle restraint system comprising a sensor as set forth in claim 1, an air bag for positioning in a vehicle to restrain motion of an occupant upon inflation of said bag, and means responsive to said sensor output signal for inflating said bag.

10. An acceleration sensor that comprises:
a body of non-magnetic construction having a first internal cavity,
a first permanent magnet mounted within said cavity for movement therewithin between at least first and second positions spaced from each other longitudinally in said cavity,
means for resiliently urging said magnet to said first position within said cavity,
bistable magnetic flux-generating means carried by said body externally of said cavity adjacent to said second position, said flux generating means generating first and second stable states of magnetic flux, and being responsive to proximity of said magnet for switching from said first state to said second state,
means positioned adjacent to said flux-generating means, and responsive to switching of said magnetic flux-generating means from said first state to said second state as a result of motion of said magnet from said first position to said second position to generate a sensor output signal, and
means for setting said flux-generating means in said first state independently of said magnet so as to prepare said flux-generating means for proximity of said magnet to switch from said first state to said second state,
said setting means comprising: a second cavity in said body parallel to said first cavity, a second permanent magnet positioned within said second cavity for movement therewithin between at least a first position spaced from said flux-generating means and a second position adjacent to said flux generating means, and means for resiliently biasing said second magnet to its first position with a lesser force than that urging said first magnet to its first position, so that acceleration forces on said sensor urging said magnets toward said second position cause said second magnet to reach its second position adjacent to said flux-generating means, and thereby set said flux-generating means to said first state, prior to arrival of said first magnet at its second position.

11. The sensor set forth in claim 10 wherein said magnet-urging means comprises magnetically permeable means positioned externally of said cavity adjacent to said first position, such that acceleration force on said magnet must overcome force of attraction between said magnet and said magnetically permeable means to move said magnet to said second position.

12. The sensor set forth in claim 10 wherein said magnet-urging means comprises a third permanent magnet mounted within said cavity at a position opposed to said first position of said first magnet, said first and third magnets having opposed like magnetic poles such that said first magnet is biased to said first position by magnetic repulsion from said third magnet.

13. The sensor set forth in claim 12 wherein said magnet-urging means further comprises magnetically permeable means positioned externally of said cavity adjacent to said first position, said third magnet and said magnetically permeable means being constructed and arranged such that the sum of the forces on said first magnet due to repulsion from said third magnet and attraction to said magnetically permeable means remains substantially constant between said first and second positions.

14. The sensor set forth in claim 12 wherein said third permanent magnet is mounted within said cavity for movement between at least first and second positions, and wherein said sensor further comprises bistable magnetic flux-generating means and output signal generating means positioned adjacent to said second position of said third magnet, such that a said sensor output signal is generated upon movement of either of said first and third permanent magnets to its associated second position.

15. The sensor set forth in claim 11 wherein said bistable magnetic flux-generating means comprise first and second weigand wires respectively positioned adjacent to said cavity and oriented such that the first flux state of said wires are respectively oriented in opposite directions parallel to said cavity, and first and second electrical coils respectively positioned adjacent to said first and second weigand wires.

16. An acceleration sensor that comprises:
a body of non-magnetic construction having a first internal cavity,
a first permanent magnet mounted within said cavity for movement therewithin between at least first and second positions spaced from each other longitudinally in said cavity, means for resiliently urging said first magnet to said first position within said cavity.

bistable magnetic flux-generating means carried by said body externally of said cavity adjacent to said second position, said flux generating means generating first and second stable states of magnetic flux, and being responsive to proximity of said magnet for switching from said first state to said second state, and means positioned adjacent to said flux-generating means, and responsive to switching of said magnetic flux-generating means from said first state to said second state as a result of motion of said first magnet from said first position to said second position to generate a sensor output signal, said magnet-urging means comprising a second permanent magnet mounted within said cavity at a position opposed to said first position of said first magnet, said first and second magnets having opposed like magnetic poles such that said first magnet is biased to said first position by magnetic repulsion from said second magnet, said second permanent magnet being mounted within said cavity for movement between at least first and second positions, and said sensor further comprising bistable magnetic flux-generating means and output signal generating means positioned adjacent to said second position of said second magnet, such that a said sensor output signal is generated upon movement of either of said first and second permanent magnets to its associated second position.

said bistable magnetic flux-generating means comprising a weigand wire positioned externally of said cavity adjacent to both of said second positions of said magnets, an electrical coil positioned adjacent to said wire, at least one additional cavity in said body parallel to said first cavity, third and fourth permanent magnets positioned in said at least one additional cavity, each of said third and fourth magnets being movable in said at least one additional cavity between an associated first position adjacent to the first position of said first and second magnets respectively and an associated second position adjacent to said wire, and means for resiliently urging said third and fourth magnets to said associated first positions with a lesser force than that urging said first and second magnets to their associated first positions.

17. The sensor set forth in claim 16 wherein said means resiliently urging said third and fourth magnets comprises at least one coil spring.

18. An acceleration sensor that comprises:
a body of non-magnetic construction having a first internal linear cavity of uniform cross section,
first and second permanent magnets mounted within said cavity, said magnets having like magnetic poles opposed to each other such that said magnets are urged to opposed ends of said cavity by force of magnetic repulsion between said magnets,
at least one weigand wire positioned externally of said cavity between said ends, said wire being characterized by first and second magnetic flux-generating states dependent upon application of an external magnetic field,
means positioned adjacent to said weigand wire and responsive to switching between said first and second flux-generating states for generating a sensor output signal as a result of acceleration forces on either of said magnets sufficient to overcome said magnetic repulsion and bring the magnet into proximity with said wire.

said at least one weigand wire comprising first and second weigand wires oriented such that fluxes generated in said first sates are in respectively opposite directions, said signal generating means comprising first and second signal generating means respectively associated with said first and second wires, and means for selectively setting said first and second wires in respective first states, said first and second signal generating means comprising means responsive to switching from said first state to said second state to generate said sensor output signals, said setting means comprising at least one additional cavity in said body parallel to said first cavity, third and fourth permanent magnets positioned in said at least one additional cavity, each of said third and fourth permanent magnets being movable in said at least one additional cavity, means for resiliently urging said third and fourth permanent magnets to opposite ends of said at least one additional cavity to positions adjacent to said first and second magnets respectively with a lesser force than that urging said first and second magnets to said ends of said first cavity, said third and fourth permanent magnets each having a direction of magnetic polarization opposite to that of the adjacent first and second magnet.

19. The sensor set forth in claim 18 wherein said resiliently urging means comprises at least one coil spring.

20. The sensor set forth in claim 19 wherein said at least one additional cavity comprises two additional cavities in said body adjacent and parallel to said first cavity, and separate therefrom and from each other, one said coil spring and one of said third and fourth magnets being positioned in each of said two additional cavities.

21. The sensor set forth in claim 18 further comprising first and second magnetically permeable means mounted on said body externally of said cavity adjacent to respective opposed ends of said cavity for resiliently attracting said magnets toward said respective ends of said cavity.

22. The sensor set forth in claim 21 wherein said first and second magnets are identical, and wherein said magnets and said magnetically permeable means are constructed and arranged such that the sum of the forces on either of said permanent magnets remains substantially constant independent of position within said cavity between at least the associated end of said cavity and a position adjacent to said wire.

23. An acceleration sensor that comprises:
a body of non-magnetic construction having a first internal linear cavity of uniform cross section,
first and second permanent magnets mounted within said cavity, said magnets having like magnetic poles opposed to each other such that said magnets are urged to opposed ends of said cavity by force of magnetic repulsion between said magnets,
at least one weigand wire positioned externally of said cavity between said ends, said wire being characterized by first and second magnetic flux-generating states dependent upon application of an external magnetic field,
means positioned adjacent to said weigand wire and responsive to switching between said first and second states for generating a sensor output signal as a result of acceleration forces on either of said magnets sufficient to overcome said magnetic repulsion and bring the magnet into proximity with said wire, and first and second magnetically permeable means mounted on said body externally of said cavity adjacent to respective opposed ends of said cavity for resiliently attracting said magnets toward said respective ends of said cavity, said first and second magnets being identical, and said magnets and said magnetically permeable means being constructed and arranged such that the sum of the forces on either of said permanent magnets remains substantially constant independent of position within said cavity between at least the associated end of said cavity and a position adjacent to said wire.

24. The sensor set forth in claim 22 wherein said at least one weigand wire comprises first and second weigand wires oriented such that fluxes generated in said first states are in respectively opposite directions, said signal generating means comprising first and second signal generating means respectively associated with said first and second wires.

25. The sensor set froth in claim 23 further comprising means for selectively setting said at least one wire in said first state, said signal generating means comprising means responsive to switching from said first state to said second state to generate said sensor output signal.

26. The sensor set forth in claim 25 wherein said setting means comprises a pair of permanent magnets and means mounting said magnets such that like magnetic poles of said magnets face in opposite directions and separation between said magnets corresponding to separation of said wires in said body.

27. The sensor set forth in claim 25 wherein said setting means comprises at least one additional cavity in said body parallel to said first cavity, third and fourth permanent magnets positioned in said at least one additional cavity, each of said third and fourth permanent magnets being movable in said at least one additional cavity, means for resiliently urging said third and fourth permanent magnets to opposite ends of said at least one additional cavity to positions adjacent to said first and second magnets respectively with a lesser force than those urging said first and second magnets to said ends of said first cavity, said third and fourth permanent magnets each having a direction of magnetic polarization opposite to that of the adjacent first and second magnet.

28. A vehicle restraint system comprising a sensor as set forth in claim 23, an air bag for positioning in a vehicle to restrain motion of an occupant upon inflation of said bag, and means responsive to said sensor output signal for inflating said bag.

29. An acceleration sensor that comprises:
a body of non-magnetic construction having a closed linear internal cavity of uniform cross section,
first and second permanent magnets movably mounted within said cavity, said magnets being identical and having like magnetic poles opposed to each other such that said magnets are urged to opposed ends of said cavity by force of magnetic repulsion between said magnets,
first and second magnetically permeable means positioned on said body externally of said cavity adjacent to opposed ends of said cavity, said magnetically permeable means being constructed and arranged such that the sum of forces of magnetic attraction between said magnets and the adjacent magnetically permeable means, and magnetic repulsion between said magnets, remains substantially constant independent of the magnets' positions in said cavity, and
means positioned between said cavity ends and responsive to magnetic flux for generating a sensor output signal upon motion of either of said magnets to a position adjacent to said generating means.

30. The sensor set forth in claim 29 wherein said signal-generating means comprises a weigand wire having a longitudinal dimension parallel to said cavity, and characterized by first and second magnetic flux-generating states dependent upon application of external magnetic fields, and means positioned adjacent to said weigand wire and responsive to switching between said first and second states for generating said output signal.

31. The sensor set forth in claim 29 wherein said signal-generating means comprises a Hall-effect sensor.

32. The sensor set forth in claim 29 wherein said signal-generating means comprises a switch having a movable switch contact resiliently supported by said body and extending into said cavity for abutment with said magnets, and a fixed contact carried by said body adjacent to said movable contact, such that abutment of a magnet on said movable contact urges said movable contact against said fixed contact, closure of said contacts comprising said output signal.

33. A vehicle restraint system comprising a sensor as set forth in claim 29, an air bag for positioning in a vehicle to restrain motion of an occupant upon inflation of said bag, and means responsive to said sensor output signal for inflating said bag.

* * * * *